(12) United States Patent
Schmidt et al.

(10) Patent No.: US 6,602,342 B2
(45) Date of Patent: Aug. 5, 2003

(54) CRYSTAL POLYMORPHS OF C.I. PIGMENT YELLOW 191 AND THEIR PREPARATION

(75) Inventors: Martin U. Schmidt, Frankfurt am Main (DE); Arpad Acs, Oberursel (DE); Rüdiger Jung, Kelkheim (DE); Franz Schui, Frankfurt am Main (DE)

(73) Assignee: Clariant GmbH, Frankfurt (DE)

( * ) Notice: Subject to any disclaimer, the term of this patent is extended or adjusted under 35 U.S.C. 154(b) by 31 days.

(21) Appl. No.: 09/897,565

(22) Filed: Jul. 2, 2001

(65) Prior Publication Data

US 2002/0077387 A1 Jun. 20, 2002

(30) Foreign Application Priority Data

Jul. 4, 2000 (DE) .......................................... 100 32 315

(51) Int. Cl.⁷ ............................................... C09B 29/46
(52) U.S. Cl. ....................... 106/498; 106/493; 106/494; 534/781
(58) Field of Search ................................. 106/493, 494, 106/498; 534/781; 47/58.1; 430/7, 135, 137

(56) References Cited

U.S. PATENT DOCUMENTS

| 5,047,517 | A | * | 9/1991 | Deucker ..................... 534/784 |
| 6,117,606 | A | | 9/2000 | Macholdt et al. ........... 430/106 |
| 6,475,543 | B2 | | 11/2002 | Kaul .......................... 426/106 |
| 6,504,045 | B2 | | 1/2003 | Jung, et al. .................. 560/37 |

FOREIGN PATENT DOCUMENTS

EP    0 361 431    3/1994

* cited by examiner

*Primary Examiner*—Anthony J. Green
(74) *Attorney, Agent, or Firm*—Anthony A. Bisulca

(57) ABSTRACT

C.I. Pigment Yellow 191 is obtained in new crystal polymorphs (beta, gamma, delta and epsilon phases) if the known alpha phase or another inventive phase of this pigment is treated with certain solvents and reprecipitated.

15 Claims, No Drawings

CRYSTAL POLYMORPHS OF C.I. PIGMENT YELLOW 191 AND THEIR PREPARATION

BACKGROUND OF THE INVENTION

The present invention relates to four novel crystal polymorphs (beta, gamma, delta and epsilon) of C.I. Pigment Yellow 191 of the formula (1), to their preparation and to their use as pigments.

C.I. Pigment Yellow 191 (from now on: P.Y. 191) is the name for the compound of the formula (1) which forms by coupling diazotized 2-amino-4-chloro-5-methylbenzenesulfonic acid with 1-(3'-sulfophenyl)-3-methyl-5-pyrazolone and then reacting the resulting disulfo acid with a calcium salt.

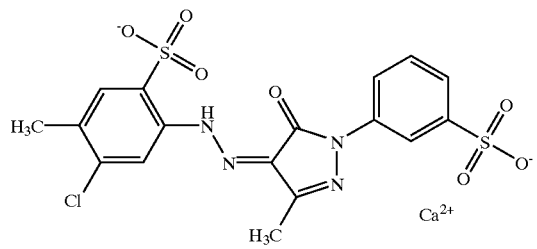

(1)

In the solid state the compound (1) may also be present in another tautomeric and/or cis/trans-isomeric form, and may also contain $Na^+$ ions, $Cl^-$ ions, and water molecules, usually in each case up to 10% by weight. Pigment Yellow 191 is described in EP-A-0 361 431.

The majority of organic pigments exist in a plurality of different crystal forms, also called polymorphs. Crystal polymorphs have the same chemical composition but a different arrangement of the building blocks (molecules or ions) in the crystal. The crystal structure determines the chemical and physical properties; consequently the individual polymorphs frequently differ in rheology, color, and other coloristic properties. The different polymorphs may be identified by means of X-ray powder diffractometry.

To date only one crystal polymorph of P.Y. 191 has been disclosed. It is referred to below as the α polymorph and has the following characteristic lines in the X-ray powder diagram (Cu—$K_\alpha$ radiation, double the Bragg angle to 2Θ in degrees, interplanar spacings d in $Å^{-1}$):

α (alpha) polymorph:

| 2Θ | d | rel. intensity |
|---|---|---|
| 4.96 | 17.78 | 51 |
| 8.98 | 9.84 | 32 |
| 10.04 | 8.80 | 16 |
| 11.33 | 7.80 | 24 |
| 11.53 | 7.66 | 20 |
| 15.00 | 5.90 | 17 |
| 16.03 | 5.52 | 20 |
| 17.21 | 5.14 | 26 |
| 18.17 | 4.87 | 39 |
| 18.56 | 4.77 | 31 |
| 19.26 | 4.60 | 18 |
| 20.12 | 4.40 | 34 |

α (alpha) polymorph:

| 2Θ | d | rel. intensity |
|---|---|---|
| 21.04 | 4.21 | 47 |
| 21.29 | 4.17 | 30 |
| 22.82 | 3.89 | 19 |
| 23.10 | 3.84 | 39 |
| 24.31 | 3.65 | 15 |
| 26.29 | 3.38 | 100 |
| 26.58 | 3.35 | 62 |
| 27.25 | 3.26 | 21 |
| 28.69 | 3.10 | 11 |
| 29.12 | 3.06 | 10 |
| 29.89 | 2.98 | 20 |
| 31.47 | 2.84 | 9 |

All of the line positions are given to an accuracy of ±0.2°.

The alpa phase is form in the synthesis of P.Y.191 if the coupling of the disulfo acid with the sulfonated pyrazolone is conducted in accordance with the details given in EP-A-0 361 431.

SUMMARY OF THE INVENTION

It has now surprisingly been found that, by treating P.Y. 191 with certain solvents, four new crystal polymorphs are formed. The new polymorphs are called β (beta), γ (gamma), δ (delta) and, ε (epsilon) forms.

They feature the following characteristic lines (Cu—$K_{60}$ radiation, 2Θ in degrees, d in $Å^{-1}$):

β (beta) polymorph:

| 2Θ | d | rel. intensity |
|---|---|---|
| 4.90 | 18.03 | 100 |
| 8.44 | 10.47 | 9 |
| 9.49 | 9.31 | 10 |
| 10.04 | 8.80 | 19 |
| 12.53 | 7.05 | 8 |
| 14.73 | 6.01 | 12 |
| 15.21 | 5.81 | 20 |
| 15.79 | 5.60 | 12 |
| 16.93 | 5.23 | 9 |
| 17.74 | 4.99 | 17 |
| 18.50 | 4.79 | 13 |
| 19.79 | 4.48 | 13 |
| 20.11 | 4.41 | 17 |
| 21.77 | 4.07 | 7 |
| 23.01 | 3.86 | 8 |
| 25.44 | 3.49 | 32 |
| 25.85 | 3.44 | 19 |
| 26.89 | 3.31 | 10 |
| 29.11 | 3.06 | 7 |
| 29.71 | 3.00 | 5 |
| 30.40 | 2.93 | 7 |

γ (gamma) polymorph

| 2Θ | d | rel.intensity |
|---|---|---|
| 4.77 | 18.49 | 100 |
| 10.08 | 8.76 | 27 |
| 11.79 | 7.50 | 29 |
| 13.39 | 6.60 | 20 |
| 14.34 | 6.17 | 21 |
| 16.71 | 5.30 | 22 |
| 18.23 | 4.86 | 30 |
| 21.22 | 4.18 | 29 |

| -continued | | |
|---|---|---|
| 22.67 | 3.91 | 21 |
| 23.10 | 3.84 | 20 |
| 25.79 | 3.45 | 36 |
| δ (delta) polymorph | | |
| 2Θ | d | rel. intensity |
| 4.69 | 18.82 | 46.6 |
| 8.14 | 10.85 | 28.1 |
| 8.67 | 10.19 | 23.8 |
| 10.09 | 8.76 | 24.7 |
| 11.37 | 7.78 | 25.1 |
| 13.50 | 6.55 | 18.8 |
| 15.83 | 5.60 | 19.9 |
| 16.27 | 5.44 | 22.9 |
| 17.03 | 5.20 | 29.2 |
| 17.70 | 5.01 | 20.7 |
| 19.13 | 4.63 | 20.4 |
| 19.39 | 4.57 | 26.1 |
| 20.27 | 4.38 | 22.0 |
| 21.41 | 4.15 | 39.6 |
| 22.96 | 3.87 | 32.4 |
| 24.16 | 3.68 | 100.0 |
| 24.79 | 3.59 | 26.1 |
| 26.30 | 3.39 | 21.2 |
| 27.14 | 3.28 | 11.3 |
| 27.67 | 3.22 | 12.8 |
| 30.99 | 2.88 | 10.5 |
| 31.59 | 2.83 | 10.6 |
| 33.13 | 2.70 | 10.6 |
| ε (epsilon) polymorph: | | |
| 2Θ | d | rel. intensity |
| 5.34 | 16.54 | 66 |
| 7.81 | 11.31 | 100 |
| 12.20 | 7.25 | 35 |
| 18.49 | 4.79 | 45 |
| 23.22 | 3.83 | 63 |
| 25.04 | 3.55 | 57 |
| 29.58 | 3.01 | 29 |

The line positions are recorded to an accuracy of ±0.2° in the case of the beta, gamma and delta polymorphs and to an accuracy of 0.5° in the case of the epsilon polymorph.

The polymorphs of the invention may contain not only $Ca^{2+}$ ions but also $Na^+$ ions and $Cl^-$ ions and also water molecules in the crystal lattice, normally in amounts of up to 10% by weight based on the overall weight.

All four new polymorphs are of low solubility and are notable for good fastness properties and yellow colorations.

DESCRIPTION OF THE PREFERRED EMBODIMENTS

The present invention provides a process for phase conversion of P.Y. 191, which comprises causing a solvent selected from the group consisting of diethylene glycol dimethyl ether, N-methylpyrrolidone, dimethyl sulfoxide, ethylene glycol, dimethylacetamide and dimethylformamide to act on the compound of the formula (1)

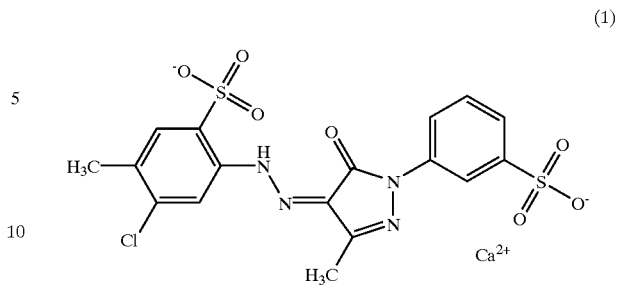

(1)

or on a tautomer, cis/trans isomer or tautomeric cis/trans isomer of the compound of the formula (1) at a temperature of preferably from 20 to 250° C., in particular from 80 to 200° C.

Judiciously the P.Y. 191 used, in the alpha phase, for example, is dissolved in the solvent and subsequently precipitated by reducing the temperature, adding water and/or evaporating the solvent, giving one or more of the phases of the invention.

The beta polymorph is obtained, for example, when C.I. Pigment Yellow 191 is recrystallized from N-methylpyrrolidone, dimethylacetamide or dimethyl sulfoxide. In this case C.I. Pigment Yellow 191, in the alpha polymorph for example, is dissolved in one of the stated solvents, preferably at a temperature of between 150 and 210° C., and then precipitated by a reduction in temperature and/or the addition of water.

The gamma polymorph is obtained, for example, by heating C.I. Pigment Yellow 191 in diethylene glycol dimethyl ether to a temperature between 150 and 170° C. and cooling it again.

The delta polymorph is obtained, for example, by heating C.I. Pigment Yellow 191 in ethylene glycol to from 170 to 200° C. and cooling it again.

The epsilon polymorph is obtained, for example, when C.I. Pigment Yellow 191 is dissolved in dimethylformamide and the solvent is evaporated under reduced pressure at from 80 to 120° C.

The starting product for preparing the new crystal phases is preferably P.Y. 191 in the alpha polymorph, although it is also possible to convert in each case one or more of the new crystal polymorphs into one of the other new crystal polymorphs by means of the measures described.

The duration of the solvent treatment may judiciously be from 10 minutes to 10 hours, preferably from 30 minutes to 5 hours.

Depending on the purity of the starting materials, the concentrations, the applied temperatures and temperature programs, any aftertreatment, the pressure, the presence of impurities or additives, and the presence of seed crystals, the new crystal polymorphs may be obtained in pure form or as a mixture of alpha and/or beta and/or gamma and/or delta and/or epsilon phases.

A pure or predominantly pure crystal polymorph is formed preferably by starting from a solution or suspension already containing seed crystals of said polymorph and if the precipitation is carried out with sufficient slowness that the supersaturation is held within a range in which the rate of crystal growth is relatively high while the rate of crystal seed formation is relatively low, so that the existing crystal seeds grow while retaining the polymorph. The use of a mechanical stirrer may be of advantage, since it breaks down existing crystals of the desired polymorph into a large number of smaller fragments which may then serve in turn as crystal seeds for this polymorph (in a process known as secondary nucleation). If the supersaturation is higher, for example, because the solution is cooled more rapidly, the rate of crystal seed formation is much higher, with the result that many crystal seeds of this polymorph and other polymorphs may form spontaneously. In this case, polymorph mixtures are obtained preferentially which consist only in part of the desired polymorph.

The preparation of a mixture of two or more of the polymorphs of the invention, or of one or more of the polymorphs of the invention with the alpha polymorph, may be of interest if certain coloristic and rheological properties are desired, especially if properties are desired which are positioned between the properties of the pure polymorphs. It is also possible, for example, to concentrate a mixture of beta or gamma polymorphs and other polymorphs in order to obtain a higher beta or gamma fraction or else to obtain the straight beta or gamma polymorphs. This may be done, for example, by sieving, recrystallizing, heat treatment, selective extraction (by dissolution or otherwise) of the other polymorphs, or by repeated application of inventive procedures in which the formation of the beta or gamma polymorph is favored. The same applies to the delta and epsilon polymorphs.

The present invention therefore additionally provides a C.I. Pigment Yellow 191 mixture comprising at least 10%, preferably at least 25%, in particular at least 50%, with particular preference at least 75%, with very particular preference at least 90%, of the beta polymorph, of the gamma polymorph, of the delta polymorph, of the epsilon polymorph, or of a mixture of two, three or four of these polymorphs.

Depending on the desired field of application it may be sensible to subject the resulting pigment to mechanical fine division. This fine division may be carried out by wet or dry grinding or by kneading. The grinding or kneading operation may be followed by treatment with a solvent, with water, or with a solvent/water mixture in order to convert the pigment into a useful form.

To facilitate the change of polymorph, to stabilize the polymorphs of the invention, to enhance the coloristic properties, and to achieve particular coloristic effects, it is possible to add pigment dispersants, surface-active agents, defoamers, extenders or other additives at any desired points of the process. It is also possible to use mixtures of these additives. The additives may be added all at once or in two or more portions. The additives may be added at any point in the synthesis or in the various aftertreatments, or following the aftertreatments. The point in time that is best suited for the addition must be determined beforehand by means of rangefinding tests.

The inventive C.I. Pigment Yellow 191 in the beta, gamma, delta or epsilon polymorphs, or the mixtures comprising the beta and/or gamma and/or delta and/or epsilon polymorphs, are suitable for pigmenting printing inks, varnishes, aqueous or solventborne preparations and plastics such as thermoplastic and thermosetting compositions, natural resins and synthetic resins, polystyrene and its copolymers, polyolefins, especially polyethylene and polypropylene, polyacrylic compounds, polyvinyl compounds, examples including polyvinyl chloride and polyvinyl acetate, polyesters and rubber, and also fiber manufactured from viscose and cellulose ethers, cellulose esters, polyamides, polyurethanes, polyesters, such as polyglycolterephthalates, and polyacrylonitrile.

The inventive phases of P.Y. 191 are useful as colorants in electrophotographic toners and developers, such as one- or two-component powder toners (also called one- or two-component developers) for example, magnetic toners, liquid toners, latex toners, addition polymerization toners, and specialty toners.

Typical toner binders are addition polymerization, polyaddition and polycondensation resins, such as styrene, styrene acrylate, styrene butadiene, acrylate, polyester, and phenyl-epoxy resins, polysulfones, polyurethanes, individually or in combination, and also polyethylene and polypropylene, which may contain further ingredients, such as charge control agents, waxes or flow aids, or may be subsequently modified with these additives.

The inventive phases of P.Y. 191 are further useful as colorants in powders and powder coating materials, especially in triboelectrically or electrokinetically sprayable powder coating materials that are used to coat the surfaces of articles comprising, for example, metal, wood, plastic, glass, ceramic, concrete, textile material, paper or rubber.

Powder coating resins employed particularly comprise epoxy resins, carboxyl- and hydroxyl-containing polyester resins, polyurethane resins and acrylic resins together with customary curing agents. Resin combinations are also employed. For example, epoxy resins are used frequently in combination with carboxyl- and hydroxyl-containing polyester resins. Examples of typical curing components (depending on the resin system) are acid anhydrides, imidazoles, and also dicyandiamide and its derivatives, block isocyanates, bisacylurethanes, phenolic and melamine resins, triglycidyl isocyanurates, oxazolines and dicarboxylic acids.

Furthermore, the inventive phases of P.Y. 191 are useful as colorants in inks, preferably ink-jet inks, such as those on an aqueous or nonaqueous basis, for example, in microemulsion inks and in those inks which operate in accordance with the hot-melt process.

Ink-jet inks generally contain a total of from 0.5 to 15% by weight, preferably from 1.5 to 8% by weight (calculated on a dry basis), of one or more of the compounds of the invention.

Microemulsion inks are based on organic solvents, water and, if desired, an additional hydrotropic substance (interface mediator). Microemulsion inks contain from 0.5 to 15% by weight, preferably from 1.5 to 8% by weight, of one or more of the compounds of the invention, from 5 to 99% by weight of water and from 0.5 to 94.5% by weight of organic solvent and/or hydrotropic compound.

"Solvent based" ink-jet inks contain preferably from 0.5 to 15% by weight of one or more compounds of the invention, from 85 to 99.5% by weight of organic solvent and/or hydrotropic compounds.

Hot-melt inks are based generally on waxes, fatty acids, fatty alcohols or sulfonamides which are solid at room temperature and liquefy on heating, the preferred melting range being between about 60° C. and about 140° C. Hot-melt ink-jet inks consist substantially, for example, of from 20 to 90% by weight of wax and from 1 to 10% by weight of one or more of the compounds of the invention. It is also possible for from 0 to 20% by weight of an additional polymer (as dye dissolver), from 0 to 5% by weight of dispersing aids, from 0 to 20% by weight of viscosity modifiers, from 0 to 20% by weight of plasticizers, from 0 to 10% by weight of tack additive, from 0 to 10% by weight of transparency stabilizer (which prevent, for example, crystallization of the waxes) and from 0 to 2% by weight of antioxidant to be present.

EXAMPLES

In addition, the inventive phases of P.Y. 191 are also useful as colorants for color filters, both for additive and for subtractive color generation, and for coloring seed.

In the examples below parts and percentages are by weight. The crystal polymorph of the products obtained is determined by means of X-ray powder diffractometry.

Comparative Example
(in Accordance with EP-A-0 361 431)

221 parts of 2-amino-4-chloro-5-methylbenzene-1-sulfonic acid are dissolved in 2000 parts of drinking water and 123 parts of 33% by weight sodium hydroxide solution with heating and the solution is clarified and admixed with 300 parts by volume of concentrated hydrochloric acid. The acidified solution is cooled to about 15° C. by adding ice and diazotized with 140 parts by volume of 38% by weight sodium nitrite solution. 254 parts of 1-(3'-sulfophenyl)-3-methyl-5-pyrazolone are dissolved in 2000 parts of drinking water and 150 parts of 33% by weight sodium hydroxide solution and 2.5 parts of tallow fatty propylenediamine dissolved in 80 parts of water are added. The suspension of the diazonium salt is run slowly into the solution of the coupling component, which is at 60° C., the pH being held within the range from 6.0 to 6.5 by addition of sodium hydroxide solution. When coupling is at an end, the mixture is heated to 80° C. and an aqueous solution of 250 parts of calcium chloride which is at 80° C. is run-in rapidly. The pigment suspension is subsequently stirred at 80° C. for 2 hours and then filtered and washed. The presscake is dried at 120° C.

This gives C.I. Pigment Yellow 191 in the alpha polymorph.

Example 1
Preparation of the Beta Phase by Recrystallization from NMP 25 parts of P.Y.191 in the alpha phase are dissolved in 1000 parts of N-methylpyrrolidone at 180° C. After cooling to room temperature, water is added until the pigment has precipitated out again almost quantitatively. This gives P.Y.191 in the beta phase.

Example 2
Preparation of the Beta Phase by Recrystallization from DMSO 1000 parts of dimethyl sulfoxide are heated to the boil and P.Y. 191 in the alpha phase is added in an amount such as to give a saturated solution. After cooling to room temperature, water is added until the pigment has precipitated out again almost quantitatively. This gives P.Y. 191 in the beta phase.

Example 3
Preparation of the beta phase by recrystallization from Dimethylacetamide The procedure of Example 2 is repeated but using dimethylacetamide instead of DMSO. This gives P.Y. 191 in the beta phase.

Example 4
Preparation of the Gamma Phase by Treatment with Diethylene Glycol Dimethyl Ether 10 parts of P.Y. 191 in the alpha phase are heated to the boil with 1000 parts of diethylene glycol dimethyl ether and then cooled to room temperature. The pigment is filtered off and washed with acetone. This gives P.Y.191 in the gamma phase.

Example 5
Preparation of the Delta Polymorph 10 parts of P.Y. 191 in the alpha phase are stirred at room temperature in 360 parts of ethylene glycol. The mixture is heated slowly to 180° C., stirred at 180° C. for 15 minutes, and cooled to room temperature. The pigment is filtered off, washed with acetone and dried under reduced pressure. This gives P.Y. 191 in the delta polymorph.

Example 6
Preparation of the Epsilon Phase by Heating in DMF 30 parts of P.Y. 191 in the alpha polymorph are dissolved at 100° C. in an amount of dimethylformamide to give a clear solution. This solution is evaporated to dryness under reduced pressure at 100° C. This gives P.Y. 191 in the epsilon polymorph.

What is claimed is:

1. A process for phase conversion of C.I. Pigment Yellow 191, comprising the step of subjecting the compound of the formula (1) to a solvent treatment, wherein the solvent is selected from the group consisting of diethylene glycol dimethyl ether, N-methylpyrrolidone, dimethyl sulfoxide, ethylene glycol, dimethylacetamide and dimethylformamide (1)

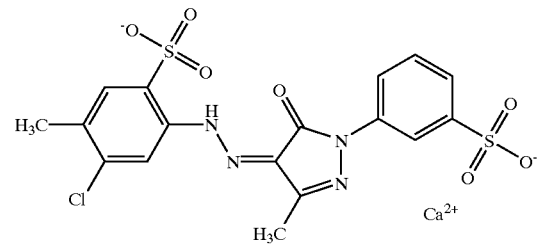

or on a tautomer, cis/trans isomer or tautomeric cis/trans isomer of the compound of the formula (1).

2. The process as claimed in claim 1, wherein the solvent is caused to act at a temperature of from 20 to 250° C.

3. The process as claimed in claim 1, wherein the solvent is caused to act at a temperature of from 80 to 200° C.

4. The process as claimed in claim 1, wherein the solvent is caused to act from 10 minutes to 10 hours.

5. The process as claimed in claim 1, wherein the compound of the formula (1) is dissolved in the solvent and then precipitated by reducing the temperature, adding water and/or evaporating the solvent.

6. The process as claimed in claim 1, wherein the compound of the formula (1) used is its alpha polymorph.

7. C.I. Pigment Yellow 191 in the form of a crystal lattice of the formula (1) or a tautomeric, cis/trans-isomeric or tautomeric cis/trans-isomeric form thereof (1)

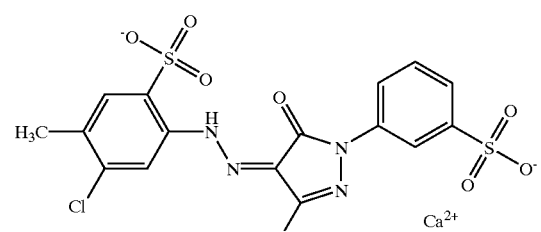

wherein the C.I. Pigment Yellow 191 exhibits the following reflections in a X-ray powder diffractogram, measured with Cu-K$_\alpha$ radiation:

| beta-polymorph: | | |
|---|---|---|
| 2Θ | d | rel. intensity |
| 4.90 | 18.03 | 100 |
| 8.44 | 10.47 | 9 |
| 9.49 | 9.31 | 10 |
| 10.04 | 8.80 | 19 |
| 12.53 | 7.05 | 8 |
| 14.73 | 6.01 | 12 |
| 15.21 | 5.81 | 20 |
| 15.79 | 5.60 | 12 |
| 16.93 | 5.23 | 9 |
| 17.74 | 4.99 | 17 |
| 18.50 | 4.79 | 13 |
| 19.79 | 4.48 | 13 |
| 20.11 | 4.41 | 17 |
| 21.77 | 4.07 | 7 |
| 23.01 | 3.86 | 8 |
| 25.44 | 3.49 | 32 |
| 25.85 | 3.44 | 19 |
| 26.89 | 3.31 | 10 |
| 29.11 | 3.06 | 7 |
| 29.71 | 3.00 | 5 |
| 30.40 | 2.93 | 7 | or
| gamma polymorph | | |
|---|---|---|
| 2Θ | d | rel. intensity |
| 4.77 | 18.49 | 100 |
| 10.08 | 8.76 | 27 |
| 11.79 | 7.50 | 29 |
| 13.39 | 6.60 | 20 |
| 14.34 | 6.17 | 21 |
| 16.71 | 5.30 | 22 |
| 18.23 | 4.86 | 30 |
| 21.22 | 4.18 | 29 |
| 22.67 | 3.91 | 21 |
| 23.10 | 3.84 | 20 |
| 25.79 | 3.45 | 36 | or
| delta polymorph | | |
|---|---|---|
| 2Θ | d | rel. intensity |
| 4.69 | 18.82 | 46.6 |
| 8.14 | 10.85 | 28.1 |
| 8.67 | 10.19 | 23.8 |
| 10.09 | 8.76 | 24.7 |
| 11.37 | 7.78 | 25.1 |
| 13.50 | 6.55 | 18.8 |
| 15.83 | 5.60 | 19.9 |
| 16.27 | 5.44 | 22.9 |
| 17.03 | 5.20 | 29.2 |
| 17.70 | 5.01 | 20.7 |
| 19.13 | 4.63 | 20.4 |
| 19.39 | 4.57 | 26.1 |
| 20.27 | 4.38 | 22.0 |
| 21.41 | 4.15 | 39.6 |
| 22.96 | 3.87 | 32.4 |
| 24.16 | 3.68 | 100.0 |
| 24.79 | 3.59 | 26.1 |
| 26.30 | 3.39 | 21.2 |
| 27.14 | 3.28 | 11.3 |
| 27.67 | 3.22 | 12.8 |
| 30.99 | 2.88 | 10.5 |
| 31.59 | 2.83 | 10.6 |
| 33.13 | 2.70 | 10.6 | or
| epsilon polymorph | | |
|---|---|---|
| 2Θ | d | rel. intensity |
| 5.34 | 16.54 | 66 |
| 7.81 | 11.31 | 100 |
| 12.20 | 7.25 | 35 |
| 18.49 | 4.79 | 45 |
| 23.22 | 3.83 | 63 |
| 25.04 | 3.55 | 57 |
| 29.58 | 3.01 | 29 | or a mixture of these polymorphs.

8. C.I. Pigment Yellow 191 of claim 7, further comprising at least one chemical in the crystal lattice, wherein the at least one chemical is selected from the group consisting of sodium ions, chloride ions, and water molecules.

9. A method for pigmenting varnishes, polymers, printing inks, aqueous or solventborne pigment preparations, electrophotographic toners and developers, powder coating materials, inks, ink-jet inks, color filters, and coloring seed comprising the step of adding C.I. Pigment Yellow 191 as claimed in claim 7 into said varnishes, polymers, printing inks, aqueous or solvent borne pigment preparations, electrophotographic toners and developers color filters, and seeds to be pigmented.

10. A C.I. Pigment Yellow 191 mixture comprising at least 10%, of the beta, gamma, delta or epsilon polymorphs:

beta-polymorph:

| beta-polymorph: | | |
|---|---|---|
| 2Θ | d | rel. intensity |
| 4.90 | 18.03 | 100 |
| 8.44 | 10.47 | 9 |
| 9.49 | 9.31 | 10 |
| 10.04 | 8.80 | 19 |
| 12.53 | 7.05 | 8 |
| 14.73 | 6.01 | 12 |
| 15.21 | 5.81 | 20 |
| 15.79 | 5.60 | 12 |
| 16.93 | 5.23 | 9 |
| 17.74 | 4.99 | 17 |
| 18.50 | 4.79 | 13 |
| 19.79 | 4.48 | 13 |
| 20.11 | 4.41 | 17 |
| 21.77 | 4.07 | 7 |
| 23.01 | 3.86 | 8 |
| 25.44 | 3.49 | 32 |
| 25.85 | 3.44 | 19 |
| 26.89 | 3.31 | 10 |
| 29.11 | 3.06 | 7 |
| 29.71 | 3.00 | 5 |
| 30.40 | 2.93 | 7 | or
| gamma polymorph | | |
|---|---|---|
| 2Θ | d | rel.intensity |
| 4.77 | 18.49 | 100 |
| 10.08 | 8.76 | 27 |
| 11.79 | 7.50 | 29 |
| 13.39 | 6.60 | 20 |
| 14.34 | 6.17 | 21 |
| 16.71 | 5.30 | 22 |
| 18.23 | 4.86 | 30 |
| 21.22 | 4.18 | 29 |
| 22.67 | 3.91 | 21 |
| 23.10 | 3.84 | 20 |
| 25.79 | 3.45 | 36 |

-continued or delta polymorph

| 2Θ | d | rel. intensity |
|---|---|---|
| 4.69 | 18.82 | 46.6 |
| 8.14 | 10.85 | 28.1 |
| 8.67 | 10.19 | 23.8 |
| 10.09 | 8.76 | 24.7 |
| 11.37 | 7.78 | 25.1 |
| 13.50 | 6.55 | 18.8 |
| 15.83 | 5.60 | 19.9 |
| 16.27 | 5.44 | 22.9 |
| 17.03 | 5.20 | 29.2 |
| 17.70 | 5.01 | 20.7 |
| 19.13 | 4.63 | 20.4 |
| 19.39 | 4.57 | 26.1 |
| 20.27 | 4.38 | 22.0 |
| 21.41 | 4.15 | 39.6 |
| 22.96 | 3.87 | 32.4 |
| 24.16 | 3.68 | 100.0 |
| 24.79 | 3.59 | 26.1 |
| 26.30 | 3.39 | 21.2 |
| 27.14 | 3.28 | 11.3 |
| 27.67 | 3.22 | 12.8 |
| 30.99 | 2.88 | 10.5 |
| 31.59 | 2.83 | 10.6 |
| 33.13 | 2.70 | 10.6 | or epsilon polymorph

| 2Θ | d | rel. intensity |
|---|---|---|
| 5.34 | 16.54 | 66 |
| 7.81 | 11.31 | 100 |
| 12.20 | 7.25 | 35 |
| 18.49 | 4.79 | 45 |
| 23.22 | 3.83 | 63 |
| 25.04 | 3.55 | 57 |
| 29.58 | 3.01 | 29 | or a mixture of two, three or four of these polymorphs.

11. A C.I. Pigment Yellow 191 mixture as claimed in claim 10, comprising at least 25% of the beta, gamma, delta or epsilon polymorphs or a mixture of two, three or four of these polymorphs.

12. A C.I. Pigment Yellow 191 mixture as claimed in claim 10, comprising at least 50% of the beta, gamma, delta or epsilon polymorphs or a mixture of two, three or four of these polymorphs.

13. A C.I. Pigment Yellow 191 mixture as claimed in claim 10, comprising at least 75% of the beta, gamma, delta or epsilon polymorphs or a mixture of two, three or four of these polymorphs.

14. A C.I. Pigment Yellow 191 mixture as claimed in claim 10, comprising at least 90% of the beta, gamma, delta or epsilon polymorphs or a mixture of two, three or four of these polymorphs.

15. A method for pigmenting varnishes, polymers, printing inks, aqueous or solventborne pigment preparations, electrophotographic toners and developers, powder coating materials, inks, ink-jet inks, color filters, and coloring seed comprising the step of adding C.I. Pigment Yellow 191 as claimed in claim 10, into said varnishes, polymers, printing inks, aqueous or solvent borne pigment preparations, electrophotographic toners and developers, powder coating materials, inks, ink-jet inks color filters, and seeds to be pigmented.

* * * * *